Aug. 17, 1943.   J. H. WIGGINS   2,327,085
BREATHER TYPE TANK
Filed Jan. 27, 1942   2 Sheets-Sheet 1

INVENTOR;
JOHN H. WIGGINS
BY
ATTORNEY

Aug. 17, 1943.   J. H. WIGGINS   2,327,085
BREATHER TYPE TANK
Filed Jan. 27, 1942   2 Sheets-Sheet 2
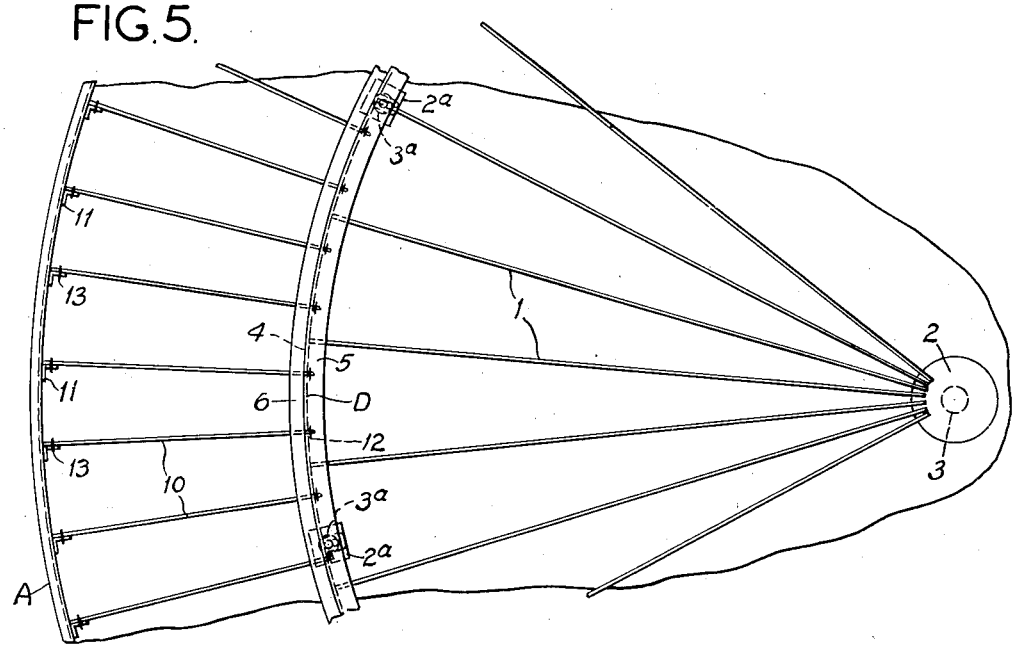
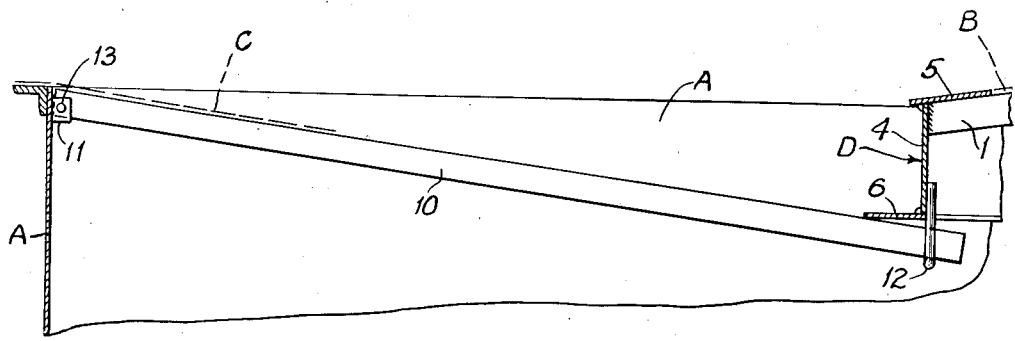
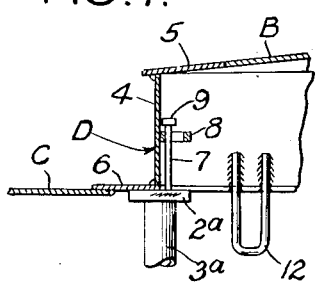
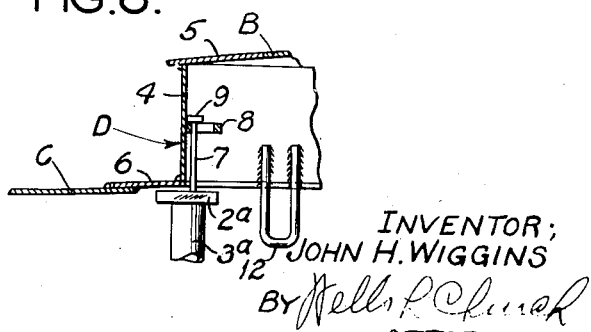
INVENTOR;
JOHN H. WIGGINS
By
ATTORNEY Patented Aug. 17, 1943

2,327,085

UNITED STATES PATENT OFFICE 2,327,085

BREATHER TYPE TANK

John H. Wiggins, Chicago, Ill.

Application January 27, 1942, Serial No. 428,422

7 Claims. (Cl. 220—85)

This invention relates to tanks and containers that are used for storing gases and/or volatile liquids, and particularly, tanks or containers equipped with a breather or balloon type roof that comprises a flexible portion which moves from a downwardly inclined position, into an upwardly-inclined position, and vice versa, during the vertical movement of the roof from one extreme position to the other.

One object of my present invention is to provide a storage apparatus of the general kind above mentioned, in which all or a portion of the framing or supporting structure inside of the container, that sustains the roof in its lowermost position, and/or on which the roof plates are laid while they are being joined together, is used to constitute a load or weight that is employed to eliminate or reduce excessive wrinkling and buckling of the previously mentioned flexible portion of the roof during the movement of said flexible portion through the horizontal plane, in passing from one inclined position to its other, oppositely-inclined position. So far as this feature of my invention is concerned, the flexible portion of the roof can be constructed and arranged in various ways, without departing from the spirit of my invention, and the framing or roof supporting structure can be of various designs and combined with the roof in various ways, so as to perform the additional function of a weight or load that is used to improve the operation of the flexible portion of the roof.

Another object of my invention is to improve the operation and reduce the cost of a storage apparatus of the general type or kind disclosed in my pending application Serial #383,525, filed March 15, 1941. The improvement in the operation of the apparatus is attained by applying an additional weight, load or downward force to the inner edge of the flexible peripheral portion of the roof in such a manner as to increase the tension in said peripheral portion and better control the radius of curvature of same when the inner edge of said peripheral portion starts to move upwardly, and the reduction in the cost of the apparatus is attained, principally by constructing the tubular rim of the roof from a member which constitutes part of a framing or supporting structure inside of the container that sustains the roof during the operation of erecting the same and when the roof is in its lowermost position.

And still another object of my invention is to increase the variable volume of a storage apparatus of the kind described in my said pending application for patent, without adding to the cost of the apparatus. This result is attained by building the framing or roof supporting structure inside of the tank, in such a way that the rafters on which the plates of the flexible peripheral portion of the roof are supported during the operation of joining said plates together, are removed at the completion of the fabricating operation, with the result that the peripheral portion of the roof will sag downwardly instead of remaining in a straight or flat condition, when the tank is at zero internal pressure. Other objects and desirable features of my invention will be hereinafter pointed out.

The apparatus described in my said pending application for patent is equipped with a roof that comprises a flexible, substantially washer-shaped peripheral portion, having its outer edge attached in a gas-tight manner to the side wall of the tank, and projecting inwardly from said side wall towards the center of the tank, a relatively heavy, stiff, vertically-disposed rim attached in a gas-tight manner to the inner edge of said flexible peripheral portion, and projecting upwardly from the same, and a central roof portion of less radius than the side wall of the tank, having its outer edge attached in a gas-tight manner to the top edge of said rim, said peripheral portion and central portion being disposed in such relationship that the peripheral portion surrounds the central portion, or lies beyond or outside of the vertical zone in which said central portion is located. When the internal pressure of the gas space of the tank is not great enough to support the weight of the roof or move it upwardly, the roof is sustained by a stationary framing or supporting structure inside of the tank, and the peripheral portion of the roof occupies a downwardly inclined position, said peripheral portion sloping downwardly and inwardly from the top edge of the side wall of the tank. If the pressure in the gas space of the tank rises, the peripheral portion of the roof starts to flex upwardly, but on account of the weight or load imposed by the rim and the central portion of the roof on the inner edge of said peripheral portion, said peripheral portion will assume a substantially convex shape or form, before the rim and the central portion of the roof start to rise. A further increase in the internal pressure of the gas space of the tank causes the rim, together with the central portion of the roof, to move bodily in an upward direction, with the result that the peripheral portion of the roof moves upwardly through a horizontal plane and assumes an upwardly inclined position.

The roof constituting my present invention is distinguished in several respects from the roof described in my said pending application for patent:

(1st) In my present roof the flexible peripheral portion of the roof is so constructed that when the tank is at zero internal pressure, said peripheral portion sags downwardly intermediate its inner and outer edges, thereby increasing the internal volume of the tank over what it would be if said peripheral portion were maintained in a flat condition, or in a straight line, when the tank is at zero internal pressure;

(2nd) The framing inside of the tank that supports the roof plates during the operation of erecting the roof, and which sustains the roof when it is in its extreme downward position, instead of being a stationary framing or supporting structure, is combined with or attached to the rim and/or to the central portion of the roof in such a way that when the internal pressure of the gas space of the tank becomes great enough to lift the roof or cause it to start to move upwardly, the weight of all or a portion of said framing is utilized to impose a sufficient load or downward force on the central portion of the roof to insure that the peripheral portion of the roof will be under great tension and will have a very definite radius of curvature, before the central portion of the roof rises perceptibly. This is advantageous, in that it tends to reduce wrinkles in the peripheral portion of the roof, and tends to prevent the plates in said peripheral portion from buckling, flexing, and making considerable noise when said pheripheral portion passes through the horizontal plane. By constructing the apparatus in this manner, I improve the operation of the peripheral portion of the roof and cause it to pass through the horizontal plane with greater ease, and I attain this highly desirable result with no additional cost, due, of course, to the fact that the roof supporting framing inside of the tank is an essential part of the apparatus, and I simply use the weight of all or a portion of said framing to hold down the inner edge of the peripheral portion of the roof, during the first portion of the operation of inflating the roof; and (3rd) The rim or vertically-disposed, tubular member that joins the inner edge of the peripheral portion of the roof to the outer edge of the central portion of the roof, is formed by a part that constitutes a circular beam, girder, or circumferentially-disposed load-carrying member of the framing inside of the tank on which the roof plates are supported while they are being connected together.

Figure 1 of the drawings is a fragmentary, vertical, transverse sectional view of a storage tank equipped with a roof constructed in accordance with my present invention, showing the roof in its downwardly deflected position, or, in other words, in its lowermost position, and sustained by a framing or supporting structure inside of the tank.

Figure 5 is a fragmentary top plan view of the framing shown in Figure 4.

Figure 6 is a detail view, on an enlarged scale, showing the vertical, cross-sectional shape of the circular beam or girder of the framing, which, in the completed roof, constitutes the vertically-disposed rim that joins the central and peripheral portions of the roof together, said view also showing how the temporary roof rafters for the flexible peripheral portion of the roof are removably mounted on the side wall of the tank and on the circular beam of the roof framing; and Figures 7 and 8 are detail views, illustrating how the circular row of supporting posts of the roof framing are combined with or attached to the circular beam, Figure 7 showing the relative position, on an exaggerated scale, of the co-operating parts of the structure before the central portion of the roof moves upwardly, and Figure 8 showing how the posts are swingingly suspended from the circular beam after the central portion of the roof has moved upwardly.

Figure 1:
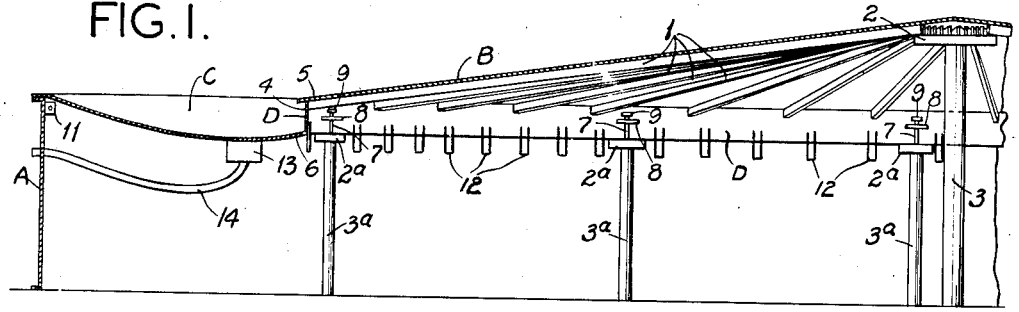
Figure 2:
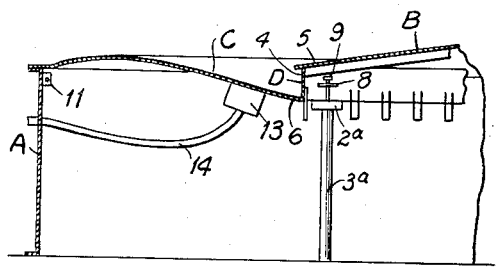
Figure 2 is a fragmentary, vertical sectional view similar to Figure 1, but showing how an increase in the internal pressure of the tank causes the peripheral portion of the roof to flex upwardly throughout its entire area before the central portion of the roof and the rim interposed between said central portion and the peripheral portion of the roof, move perceptibly in an upward direction.
Figure 3:
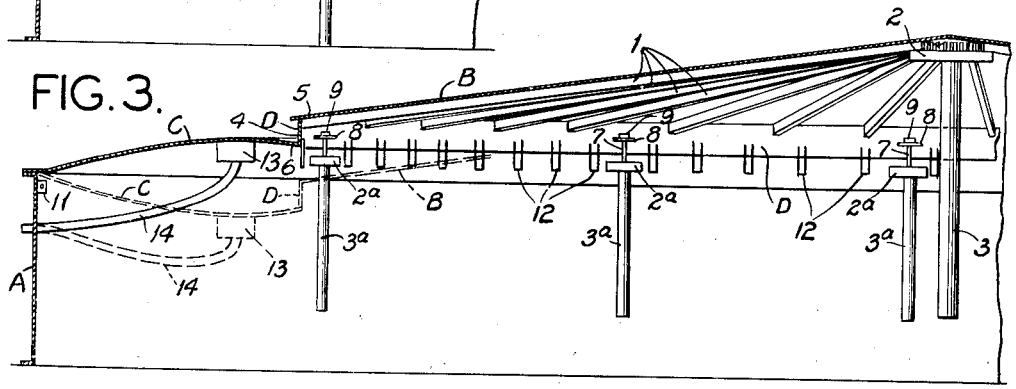
Figure 3 is a fragmentary, vertical, transverse sectional view of the apparatus, with the roof nearly inflated, showing how the stationary framing inside of the tank imposes an extra load on the central portion of the roof and on the rim at the outer edge of same, when said central portion starts to move upwardly.
Figure 4:
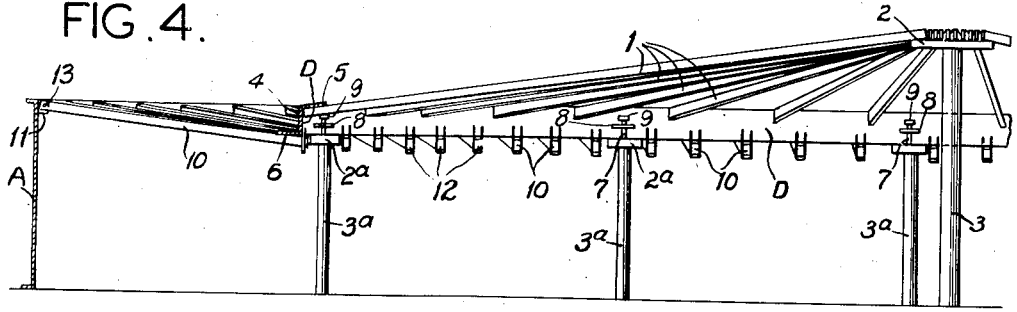
Figure 4 is a fragmentary view, taken transversely of the tank, illustrating the framing or roof supporting structure inside of the tank, and showing the temporary rafters on which the plates of the peripheral portion of the roof are supported while they are being joined together and attached to the tank side wall and to the rim between the central and peripheral portions of the roof.

In Figures 1, 2 and 3 of the accompanying drawings, which illustrate the preferred form of my invention, A designates the side wall of the tank, B designates the central portion of the roof of said tank, C designates the flexible peripheral portion of said roof whose outer edge is connected by a gas-tight joint to a compression member attached to the top edge of the side wall of the tank, and D designates a stiff, vertically-disposed, tubular rim, whose upper end is connected by a gas-tight joint to the outer edge of the central portion B of the roof, and whose lower end is connected by a gas-tight joint to the inner edge of the flexible peripheral portion C of the roof. So far as my broad idea is concerned, the central portion B of the roof may be constructed in any of the various ways described in my said pending application for patent, and the rim D may be cylindrical-shaped, polygonal-shaped, or any other preferred shape in horizontal cross section. Preferably, the central portion B of the roof consists of a rigid cone having rigidly attached to the underside of same, a plurality of permanent, radially-disposed roof rafters 1, whose inner ends are secured to a supporting plate 2 fastened to the upper end of a central supporting post 3, as shown in Figure 1. The rim D at the outer edge of said central portion B consists of a circular beam or girder composed of a vertically-disposed web plate 4 that has horizontally-disposed flanges 5 and 6 at the top and bottom edges of same, as shown in Figures 7 and 8, the top flange 5 projecting inwardly so as to form part of the top surface of the central portion B of the roof, and the bottom flange 6 projecting outwardly (towards the side wall of the tank) so as to constitute part of the top surface of the peripheral portion C of the roof. The circular beam or girder just referred to is supported by a circular row of vertical supporting posts 3ª that are attached to or combined with said circular beam in such a way that when the central portion of the roof rises, the weight of said posts 3ª will impose a load or exert a downward force on said circular beam. Due to the fact that the rafters 1 are attached to the central portion of the roof, and also to the center post 3, these parts 1 and 3 of the roof supporting structure also constitute an additional load on the central portion of the roof and the rim.

It is immaterial, so far as my broad idea is concerned, how the supporting posts 3ª are attached to the circular beam that constitutes the rim D of the roof, but I prefer to provide said posts 3ª at their upper ends with horizontally-disposed plates 2ª that carry vertically-disposed rods 7 which project upwardly through bearings 8 that extend inwardly from the vertical web plate 4 of the rim D, said rods 7 having heads 9 at their upper ends that are preferably disposed in spaced relationship with the bearings 8 on the rim D when the central portion B of the roof is in its lowermost position, as shown in Figure 7. When the central portion of the roof rises or moves upwardly, as shown in Figure 3, the heads 9 on the upper ends of the rods 7 come into engagement with the bearings 8, as shown in Figure 8, and thus cause the posts 3ª to be swingingly suspended from the rim D of the roof. Thus, in my improved roof, the weight of the center post 3 and the weight of the circular row of posts 3ª is utilized to hold down the inner edge of the peripheral portion C of the roof, during the first portion of the operation of inflating the roof. This added weight, of course, resists or opposes upward movement of the central portion of the roof, with the result that the peripheral portion C will be placed under greater tension, and will flex into an arc of more definite and certain radius than would be possible to attain in the absence of this added weight.

During the operation of construction the flexible peripheral portion C of the roof, temporary roof rafters 10 are fastened to the side wall A of the tank and to the circular beam or girder of the roof framing that constitutes the rim D of the completed roof, so as to form a supporting structure for the roof plates of the peripheral portion C of the roof, while said roof plates are being joined together and connected in a gas-tight manner to the side wall of the tank and to the lower end of the rim D. In order that said temporary roof rafters 10 can be installed and removed quickly and easily, the side wall A of the tank is provided with bearings 11 that are adapted to receive the outer end portions of the rafters 10, and the circular beam or girder formed by the web plate 4 and flanges 5 and 6, is provided with bearings 12 that are adapted to receive the inner end portions of the roof rafters 10. Preferably, the bearings 11 on the tank side wall consists of substantially U-shaped devices fastened to the inner face of said side wall in spaced relation, at the top edge of same, and the bearings 12 that receive the inner end portions of the temporary rafters 10 also consist of substantially U-shaped devices that project downwardly from the bottom edge of the web plate 4, as shown in Figure 6. The temporary rafters 10 can be retained in their supporting bearings 11 and 12 in any suitable way, as, for example, by removable pins 13 that are inserted transversely through aligned holes in the rafters 10 and in the side pieces of the bearings 11 in which the outer end portions of said rafters are positioned.

During the operation of building or erecting the roof, the posts 3ª are arranged in a circular row, and the circular beam or girder which is to constitute the rim D of the completed roof is mounted on the supporting plates 2ª at the upper ends of the posts 3. The temporary roof rafters 10 are then positioned in the bearings 11 on the tank side wall and in the bearings 12 that depend from said circular beam or girder, after which the center post 3 and radially-disposed roof rafters 1 are erected, the rafters 1 being fastened at their inner ends to the supporting plate 2 at the upper end of the center post 3 and also connected at their outer ends to the vertically-disposed web plate 4 of said circular girder. The roof plates that are to constitute the central portion B of the roof are then laid on the permanent roof rafters 1 and joined together, so as to form a cone-shaped structure whose outer edge is attached in a gas-tight manner to the top flange 5 of the circular girder of the roof framing, thus completing the central portion of the roof. Similarly, the roof plates that are to constitute the peripheral portion C of the roof are laid on the temporary rafters 10 and joined together so as to form a substantially washer-shaped element that is attached at its inner edge in a gas-tight manner to the bottom flange 6 of the circular beam and attached at its outer edge in a gas-tight manner to the compression member at the top edge of the tank side wall A. The roof is completed by rigidly attaching the permanent rafters 1 to the plates constituting the central portion B of the roof, and thereafter, an eccentric load (not shown), is mounted on the top side of the central portion of the roof adjacent the edge of same, as described in my said pending application for patent, so as to cause the rim D of the roof to tilt or assume an angular position, due to said eccentric load, when the central portion of the roof moves upwardly and downwardly.

When the inflation of the roof is first started, the peripheral portion of the roof flexes upwardly, and due to the fact that the combined weight of the rim D, the central roof portion B, and the roof supporting framing inside of the tank, exerts a downward force on the inner edge of the flexible peripheral portion C, said peripheral portion will flex upwardly throughout its entire area, as shown in Figure 2, and assume a convex shape or form having a definite and controlled radius of curvature, before there is any appreciable upward movement of the rim D. As the internal pressure of the tank increases, the rim D tilts or assumes an angular position, and then resumes its normal level or horizontal position and moves upwardly with the central portion B of the roof into the position shown in Figure 3, such upward movement of the rim and central portion of the roof causing the circular roof supporting posts 3ª inside of the tank to be lifted from the bottom of the tank and swingingly suspended from the rim D in such a way that they will not interfere with the tipping or tilting of the rim. This method of attaching the supporting posts 3ª to the central portion of the roof also insures that said posts will descend to the same position on the bottom of the tank when the roof subsequently returns to its lowermost or extreme downwardly deflected position.

The center post 3 is, of course, connected to the central portion of the roof and moves upwardly and downwardly with same. A considerable saving in the amount of steel used in the apparatus is effected by constructing the rim D of the completed roof in such a way that during the operation of erecting the roof, said rim constitutes a circular beam or girder of the supporting structure in the tank on which the roof is erected. The fact that the temporary roof rafters 10 do not form a permanent part of the structure and may be used in the construction of other roofs also effects a saving in steel.

The main advantage of my improved construction, however, resides in the fact that the framing inside of the tank performs the dual function of a supporting structure for the roof, and an extra weight or load that is exerted on the central portion of the roof and on the rim in such a way as to put considerable tension in the flexible peripheral portion C of the roof, and cause the latter to assume a definite curved shape in contrast to an undetermined flip-flap shape that said peripheral portion would take, in the absence of such an additional weight or load. Rolled roof plates are never perfectly flat, but on the contrary, they have wrinkles or humps that form in the plates when the plates are being rolled. These built-in wrinkles or humps cause a limber or flexible roof, which is not under tension, to produce considerable noise when the roof flexes, and in many instances, the built-in wrinkles in the roof plates are so sharp that they crack or fail as a result of the flexing of the roof. My present invention, i. e., using the added weight of the framing inside of the tank to impose a downward load on the inner edge of the peripheral portion C of the roof overcomes the above mentioned inherent objection of a limber or flexible roof, or roof portion that has an undetermined flip-flap shape, and it insures that the peripheral portion of the roof will pass through the horizontal plane substantially noiselessly and without excessive wrinkling.

Still another desirable feature of my above described roof, is that the peripheral portion C of the roof assumes such a shape or form when the roof is in its lowermost position, as shown in Figure 1, that the inner edge part of said peripheral portion slopes downwardly radially away from the rim D. This allows the positioning of a drain sump 13 far enough away from the rim D and leave enough of the limber portion of the part C between the rim D and the relatively inflexible sump 13, so that part C can flex between the sump and rim D, as much as is required by the movement of the roof. Drain water is conducted out of the sump 13 by a flexible drain hose 14, which leads through the side wall of the tank.

Having thus described my invention, what I claim as new and desire to secure by Letters Patent of the United States, is:

1. A breather type roof for storage tanks, comprising a central portion of less radius than the tank side wall, and a flexible peripheral portion of substantially annular form arranged beyond or outside of said central portion, said peripheral portion having its outer edge attached to the top edge of the tank side wall, a vertically-disposed rim interposed between said central portion and peripheral portion and attached in a gas-tight manner to the adjacent edges of said portions, and a structure in the tank, on which the roof is erected, movably mounted on the bottom of the tank and fastened to the roof so as to impose a load on same when the central portion of the roof rises.

2. A storage apparatus, comprising a tank or container provided with a side wall, a breather type roof provided with a flexible peripheral portion and a central portion carried by said peripheral portion, said peripheral portion being attached at its outer edge to the tank side wall and projecting inwardly from same, and a supporting structure inside of the tank, on which the roof is erected, attached to the central portion of the roof and comprising removable erecting rafters for the peripheral portion of the roof.

3. A structure of the kind described in claim 2, which includes a vertically-disposed, tubular rim interposed between the central and peripheral portions of the roof and attached in a gas-tight manner to the adjacent edges of said portions, and a supporting means on said rim and on the tank side wall for said removable, erecting rafters.

4. A storage apparatus, comprising a container provided with a side wall, a breather or balloon type roof attached at its outer edge to the side wall of the container, a circumferentially-disposed girder incorporated into said roof between the center and the peripheral edge of same, and a supporting structure inside of the tank adapted to be sustained by the bottom of the tank under certain conditions and permanently attached to the central portion of the roof and to said girder so as to rise and fall with said parts.

5. A storage apparatus, comprising a tank, a breather or balloon type roof for said tank comprising a central portion provided at its outer edge with a vertically-disposed rim whose top edge is attached to said central portion, a flexible peripheral roof portion projecting inwardly from the side wall of the tank and attached to the lower end of said rim, and permanent roof rafters and supporting legs attached to the central portion of the roof so as to rise and fall with same.

6. A structure of the kind described in claim 5, in which said rim constitutes part of the framing on which the roof is fabricated and comprises a substantially annular shaped web plate provided at its top and bottom edges with laterally-projecting flanges that constitute parts of the top surfaces of the central and peripheral portions of the roof.

7. A storage apparatus, comprising a tank or a container, a breather type roof provided with a flexible peripheral portion and with a central rigid portion, and means for suspending said peripheral portion between the top of the tank and the periphery of said rigid portion, comprising a circumferential girder built into said rigid portion, and supporting posts adapted to rest on the bottom of the tank and attached to said girder so as to rise and fall with same when said central portion moves bodily in response to flexing of said peripheral portion.

JOHN H. WIGGINS.